(12) United States Patent
Kacines

(10) Patent No.: US 12,616,167 B2
(45) Date of Patent: May 5, 2026

(54) FURNITURE BENCH WITH A PET RAMP

(71) Applicant: Jeffery J. Kacines, Allen, TX (US)

(72) Inventor: Jeffery J. Kacines, Allen, TX (US)

( * ) Notice: Subject to any disclaimer, the term of this patent is extended or adjusted under 35 U.S.C. 154(b) by 0 days.

(21) Appl. No.: 18/734,150

(22) Filed: Jun. 5, 2024

(65) Prior Publication Data

US 2025/0057111 A1      Feb. 20, 2025

Related U.S. Application Data

(60) Provisional application No. 63/533,194, filed on Aug. 17, 2023.

(51) Int. Cl.
| | |
|---|---|
| *A01K 1/035* | (2006.01) |
| *A47C 11/00* | (2006.01) |

(52) U.S. Cl.
CPC .............. A01K 1/035 (2013.01); A47C 11/00 (2013.01)

(58) Field of Classification Search
CPC ......... A01K 1/035; A47C 11/00; B65G 69/30
USPC ........................................... 119/847
See application file for complete search history.

(56) References Cited

U.S. PATENT DOCUMENTS

| | | | | |
|---|---|---|---|---|
| 3,173,398 | A | 3/1965 | Raymond | |
| 3,481,311 | A | 12/1969 | Schluttig | |
| 3,797,461 | A | 3/1974 | Breeden | |
| 4,846,304 | A * | 7/1989 | Rasmussen ............ | A47B 77/10 |
| | | | | 182/35 |
| 5,213,060 | A | 5/1993 | Sloan et al. | |

| | | | | |
|---|---|---|---|---|
| 5,803,523 | A * | 9/1998 | Clark ...................... | B60P 1/435 |
| | | | | 296/61 |
| 5,870,788 | A * | 2/1999 | Witkin .................... | B66F 7/243 |
| | | | | 414/921 |
| 6,119,634 | A | 9/2000 | Myrick | |
| 6,267,082 | B1 | 7/2001 | Naragon et al. | |
| 6,536,372 | B1 * | 3/2003 | Loeser ................... | A01K 1/035 |
| | | | | 119/28.5 |
| 6,732,676 | B1 | 5/2004 | Smith | |
| 7,011,045 | B1 * | 3/2006 | Zehner ................... | A01K 1/035 |
| | | | | 4/496 |
| 7,302,725 | B2 * | 12/2007 | Thygesen .............. | B65G 69/30 |
| | | | | 14/69.5 |
| 7,621,236 | B2 | 11/2009 | Steffey et al. | |
| 7,878,150 | B2 | 2/2011 | Dietz | |
| 8,117,994 | B1 | 2/2012 | Goodlow | |
| 8,978,177 | B1 | 3/2015 | Peele | |
| D734,570 | S | 7/2015 | Hawk | |
| D736,484 | S | 8/2015 | Jakubowski et al. | |
| 9,856,654 | B1 | 1/2018 | Tagart et al. | |
| 11,540,486 | B2 | 1/2023 | Weber et al. | |

(Continued)

OTHER PUBLICATIONS

Internet Page, Truck Ramp, author unknown, date unknown.
Internet Page, Indoor Wooden Pet Ramp, author unknown, date unknown.

*Primary Examiner* — Zoe Tam Tran
(74) *Attorney, Agent, or Firm* — Roger N. Chauza, PC

(57) ABSTRACT

A piece of household furniture constructed in the form of a bench seat that is equipped with a pet ramp. A portion or all of the seat forms the pet ramp when pivoted from a horizontal seat position to an inclined pet ramp position. A pet can thus move from the floor via the inclined pet ramp, and from the bench to a bed or other furniture. When the pet ramp is not in use, it is pivoted to a horizontal position to form the bench seat, which then appears as a typical piece of furniture.

15 Claims, 7 Drawing Sheets

(56) References Cited

U.S. PATENT DOCUMENTS

| 11,585,096 | B2 * | 2/2023 | Jakubowski | .......... E04F 11/002 |
| 2005/0115522 | A1 | 6/2005 | Bishop | |
| 2006/0150346 | A1 | 7/2006 | Myrick et al. | |
| 2007/0006816 | A1 | 1/2007 | Dietz | |
| 2007/0163510 | A1 | 7/2007 | Dietz | |
| 2014/0123910 | A1 | 5/2014 | Rorke et al. | |
| 2016/0144759 | A1 | 5/2016 | DiBlasio et al. | |
| 2018/0105091 | A1 * | 4/2018 | Stevens | ..................... B60P 3/04 |
| 2018/0228121 | A1 * | 8/2018 | Murray | .................. A01K 29/00 |
| 2020/0060224 | A1 | 2/2020 | Volin | |
| 2021/0146842 | A1 | 5/2021 | Niemela et al. | |

* cited by examiner

FURNITURE BENCH WITH A PET RAMP

TECHNICAL FIELD OF THE INVENTION

The present invention relates in general to furniture and pet ramps, and more particularly to methods and apparatus for integrating a pet ramp into household furniture so that when not deployed, the pet ramp appears as a top of the furniture.

BACKGROUND OF THE INVENTION

Pet ramps of all kinds are routinely available to enable pets to more easily negotiate their movement from the floor to a bed or couch, and vice versa. Some furniture is simply too high for small pets to jump thereon from the floor. Pet ramps are especially useful for older pets who have joint ailments and find that the movement of their bodies or jumping is stressful and painful. To that end, pet ramps of various types are available to assist pet movement between household furniture or vehicles and the floor or ground, as well as in other situations.

Most pet ramps that are known in the industry are constructed of sturdy metal, plastic or wood and have the look or appearance of industrial or mechanical apparatus. Many of the pet ramps available are designed and constructed for a single purpose, i.e., an inclined ramp that serves a single purpose, namely to assist a pet in moving from the floor or ground to an elevated platform. As such, these types of pet ramps often include a ramp and at the upper end thereof a platform is formed. While this type of pet ramp functions for its desired purpose, it is often not aesthetically pleasing, and so much so that they are not often desired for use in a home along with other household furniture.

The prior art includes a few attempts to simulate pet ramp structures as furniture. For example, in U.S. Pat. No. 3,797,461, a pet house is disclosed. The pet house is constructed with wood that looks like furniture and has facilities for housing a pet, but nevertheless serves a single purpose for a pet and cannot also serve as furniture that one can sit on. A dual use structure is not available which is functional for pet use as well as human use. Further, the ramp disclosed in this patent is either part of a top or side of the pet house, and is moved about a hinged edge to either close a top or side opening of the pet house. As such, the pet ramp is always visible and cannot be disguised as part of the household furniture and appear as part of typical household furniture. It is well known that household furniture does not normally include ramp apparatus.

U.S. Pat. No. 8,978,177 describes a person's bed equipped with a pet ramp formed at the foot of the bed. While this affords an easy path for pets to gain access to the top of the bed, the pet ramp remains visible as an inclined structure and is always visible as such. This patent describes the pet ramp as being hidden, as the foot board hides the pet ramp from the frontal side thereof, but the top and end of the pet ramp apparatus is still visible. The bed cannot function as a bed alone without the pet ramp located alongside the bed. Thus, the bed constitutes a furniture piece, but the visible pet ramp cannot be disguised.

Many other pet ramp structures are known in the prior art. U.S. Published patent application 2020/0060224 describes a stand-alone pet crate that is collapsible, and includes a ramp. Other pet ramps are described in the following patents: U.S.

Pat. Nos. D736,484; D734,570; 6,732,676; 7,621,236; 8,117,994; 2014/0123910; 22016/0144759 and 2021/0146842.

SUMMARY OF THE INVENTION

In accordance with the principles and concepts of the invention, disclosed is a piece of household furniture constructed as a bench seat used for sitting on, and with a pet ramp integrated therein. Thus, when the pet ramp is not deployed, the bench seat appears as a conventional piece of household furniture because the pet ramp is disguised as all or part of the bench seat. When the pet ramp is extended and inclined from the bench seat, a pet can easily move between the floor and a bed, or other furniture, depending on where the user chooses to place the bench seat. Even when the pet ramp is deployed, the household furniture may, in some instances, still be used by a person.

According to an embodiment of the invention, disclosed is a bench seat that includes an upholstered cushion and finished wood components that include a cushion support, legs, a pet ramp and a magazine rack, all finished with a decorative furniture coating. Thus, the bench seat appears as a common piece of household furniture. A user can sit on the bench seat, and when the ramp is deployed, a pet can negotiate the pet ramp.

A feature of the bench seat of the invention is that it is portable and can be moved adjacent to other pieces of furniture. For example, the bench seat of the invention can be moved and positioned adjacent a bed in order for the pet to move from the floor to the bed, and vice versa. Similarly, the bench seat of the invention can be moved adjacent a couch or chair so that a pet can negotiate movement between the floor and the couch or chair.

With regard to a feature of the invention, the furniture bench includes a seat that is constructed in two-parts, where one part is a stationary platform for sitting on, and the other part is hinged to the stationary platform to form a pet ramp. When the pet ramp part is placed in the horizontal position, it is coplanar with the stationary part and thus the two parts form a bench seat. In this configuration, the furniture bench appears as an ordinary piece of household furniture. When the pet ramp part is moved to an inclined position, it forms the pet ramp. The furniture bench is preferably constructed as typical household furniture, and the bench seat may or may not be upholstered.

According to a feature of the invention, the furniture bench includes a frame and legs that support the two-part seat. A support rod is employed to support the pet ramp part of the seat when it is in the horizontal seat position. The support rod allows the pet ramp part of the seat to support heavy weights when used as a seat. The support rod can be rotated out of the way to allow the pet ramp to be lowered to the inclined position.

A further feature of the invention is that the furniture bench includes a rectangular rack that can hold items such as pet supplies, shoes, magazines, etc. The rack is located below the bench seat and is fastened at its corners to the furniture bench legs. This feature further enhances the bench seat as household furniture. The rack can be constructed of decorative wood, as wood slats, etc.

Yet another feature of the invention is that the furniture bench can be constructed as a multi-section seat, where one or more sections constitute a permanent and non-movable part of the seat, and the remaining sections constitute a pet ramp. The pet ramp sections are hinged to the non-movable seat sections. Thus, the multi-section seat appears as a typical household bench seat when in the horizontal position, but when the remaining sections are moved to the inclined position, the furniture is converted to a pet ramp.

An aspect of the invention is that when employing the multi-section seat, the furniture bench can be equipped with frontal legs that are pivotal so that the end of the pet ramp can be lowered to the inclined position. The frontal legs themselves can be pivotally mounted to the seat support, or the frontal legs can be made in two parts, where only the top part is made pivotal. This aspect can also be utilized in an embodiment where the entire seat is unitary and is made pivotal by the use of frontal pivotal legs.

According to an embodiment of the invention, disclosed is a furniture bench that includes a seat with a top horizontal surface for sitting on, and at least a portion of the seat comprises a pet ramp. The pet ramp is rotatable so that an outer edge thereof can be moved from a horizontal position and approaches a floor on which the furniture bench rests. A pet can then ascend from the floor and up the top sitting surface of the pet ramp. Provided are plural legs for supporting the seat on the floor.

According to another embodiment of the invention, disclosed is a furniture bench that includes a frame supported by legs, where the legs are adapted for resting on a floor. The frame is constructed of wood and finished to resemble wooden household furniture. A seat is supported by the frame, and the seat is upholstered with household upholstery. Further included is a rectangular-shaped rack, where the rack is adapted for storing household items thereon. The rack has four corners where each corner of the rack is attached to a respective leg. A first portion of an upper surface of the seat defines a stationary platform, and a second portion of the upper surface of the seat defines a pivotal pet ramp. An edge of the pet ramp has a hinged connection to an adjacent edge of the stationary platform. The pet ramp is pivotal at the hinged connection to form an incline from the stationary platform toward the floor. The pet ramp is also pivotal back to a horizontal position so that the pet ramp is coplanar with the stationary platform.

According to another embodiment of the invention, disclosed is a method of converting a furniture bench with a seat into a pet ramp. The conversion includes using a first portion of the seat as a stationary platform for sitting on, and using a second portion of the seat as a platform for sitting on, where the second portion of the seat is coplanar with the first portion of the seat when the second portion is positioned horizontally. The second portion of the seat is used as a pet ramp by pivotally moving the second portion of the seat with respect to the first portion of the seat to form an incline for the pet ramp. A pet is then allowed to ascend up the inclined pet ramp to the first portion of the seat of the furniture bench.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION OF THE INVENTION

Figure 1:
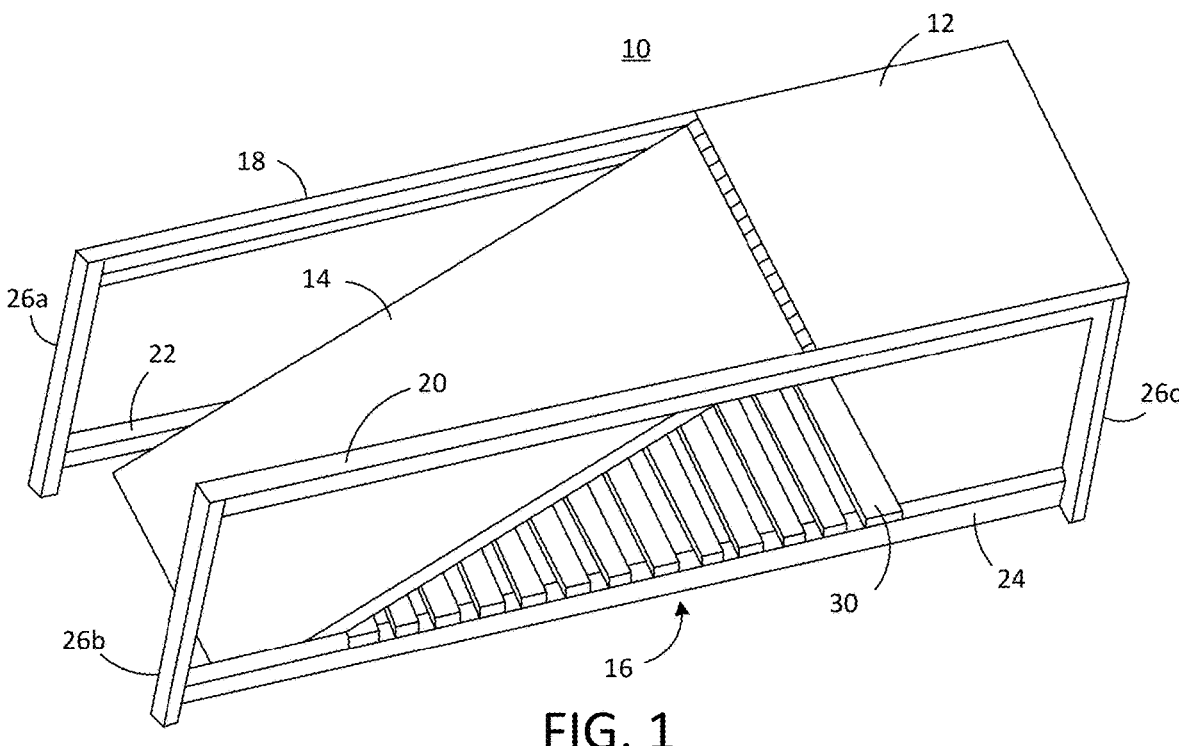
FIG. 1 is an isometric view of a furniture bench seat, with a hinged pet ramp incorporated therein, constructed according to an embodiment of the invention.

According to an embodiment of the invention, disclosed in FIG. 1 is a furniture bench 10 that can be situated at the foot of a bed (not shown), to assist pets to ascend from the floor to the bed. Of course, the furniture bench 10 can be placed adjacent to many other types of furniture to accomplish the same function. The furniture bench 10 includes a permanent bench seat section 12 on which a person or pet can sit, or otherwise hold blankets, pillows, etc. The furniture bench 10 further includes a hinged section 14 which, in one orientation effectively extends the permanent seat section 12, and in a hinged orientation forms an inclined pet ramp 14. The inclined pet ramp 14 allows a pet to walk thereon and ascend to the surface of either the bench seat section 12, or other adjacent furniture. The permanent seat section 12 and the hinged pet ramp section 14 form an upper section of the furniture bench 10. A lower section is formed by a magazine rack 16 which underlies the upper section. The magazine rack 16 provides rigidity to the bench structure 10 and allows items to be stored thereon.

In more detail, the furniture bench 10 of FIG. 1 is constructed with a pair of upper spaced-apart horizontal rails 18 and 20, as well as a pair of lower spaced-apart horizontal rails 22 and 24. The ends of the upper rails 18 and 20 are connected to the respective ends of the lower rails 22 and 24 with four respective legs, two frontal legs identified as numerals 26a and 26b, and two rear legs, one identified as numeral 26c and the other rear leg not shown. The four legs 26 support the furniture bench 10 on the floor. As will be described in more detail below in connection with FIG. 3, the upper rails 18 and 20 are each bifurcated, i.e., each having an upper part and a lower part. The upper rail 18 has, for example, an upper part 18*a* and a lower part 18*b*. Similarly, the opposite upper rail 20 has an upper part 20*a* and a lower part 20*b*. The bifurcated upper rails 18 and 20 extend only on each side of the hinged pet ramp 14, but the lower parts 18*b* and 20*b* extend the entire length of the pet ramp 14 as well as along the permanent platform 12. When hinged to the horizontal position, the pet ramp 14 is located between the spaced-apart upper rails 18*a* and 20*a*. As such, the top surface of the hinged pet ramp 14 is level with the top surface of the upper rails 18*a* and 20*a*. This arrangement allows the top surface of the permanent platform 12 to be level, or coplanar, with the top surface of the hinged pet ramp 14. The permanent platform 12 as well as the hinged pet ramp 14 can then be used as a full seat for a person or pet to sit on, and otherwise provide the appearance of a piece of furniture.

As noted above, the platform 12 serves as a place for pets to sit on, or to move therefrom onto the furniture. A storage area constitutes a rack 16 constructed in this embodiment as a number of slats, one shown as numeral 30. The slats 30 are fastened on top of the two lower rails 22 and 24 using glue, screws, nails or other suitable fastening means. The lower rails 22 and 24 extend and are fastened between the frontal legs and the rear legs 26. Pet supplies or other items can be stored on the slats 30. In addition to the use as a storage area, the slats 30 provide rigidity to the furniture bench 10.

Figure 2:
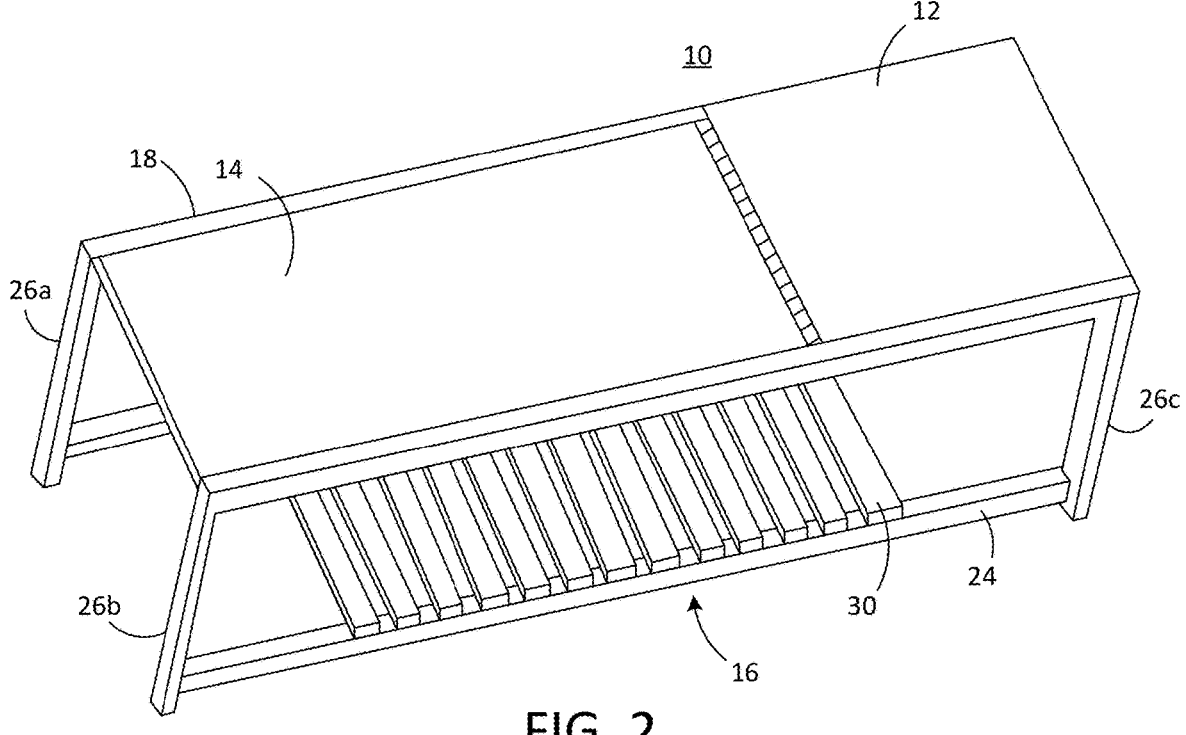
FIG. 2 is an isometric view of the furniture bench seat of FIG. 1, with the pet ramp hinged upwardly to a horizontal position to form a part of the furniture seat.

A feature of the furniture bench 10 is the pivotal pet ramp 14. The pet ramp 14 is pivoted at its rear edge adjacent to the frontal edge of the platform 12. The pet ramp 14 extends from the edge of the platform 12 to the frontal legs 26*a* and 26*b*. The pet ramp 14 is pivotal from its inclined position, as shown in FIG. 1, to a horizontal position shown in FIG. 2. The platform 12 and the pet ramp 14 define the seat of the furniture bench 10. It can be seen that at least a portion of the seat comprises the pet ramp 14. When moved to the inclined position, the frontal part of the pet ramp 14 can either rest on the floor, or on the front-most slat 30. In the inclined position, shown in FIG. 1, the pet ramp 14 is inclined to allow the pet to ascend from the floor to the permanent platform section 12. When the ramp 14 is not used, it can be pivoted back to the horizontal position shown in FIG. 2. As noted above, the pet ramp 14 and the platform 12 function as a composite seat or table located adjacent to the other household furniture. The pet ramp 14 is preferably constructed so that one or more persons can sit on the horizontal seat structures 12 and 14. While not shown, the pet ramp 14, as well as the platform 12, can be covered with a non-slip material, or a fabric, carpet, rubber material, upholstery, a padded cushion, etc.

Figures 3, 4:
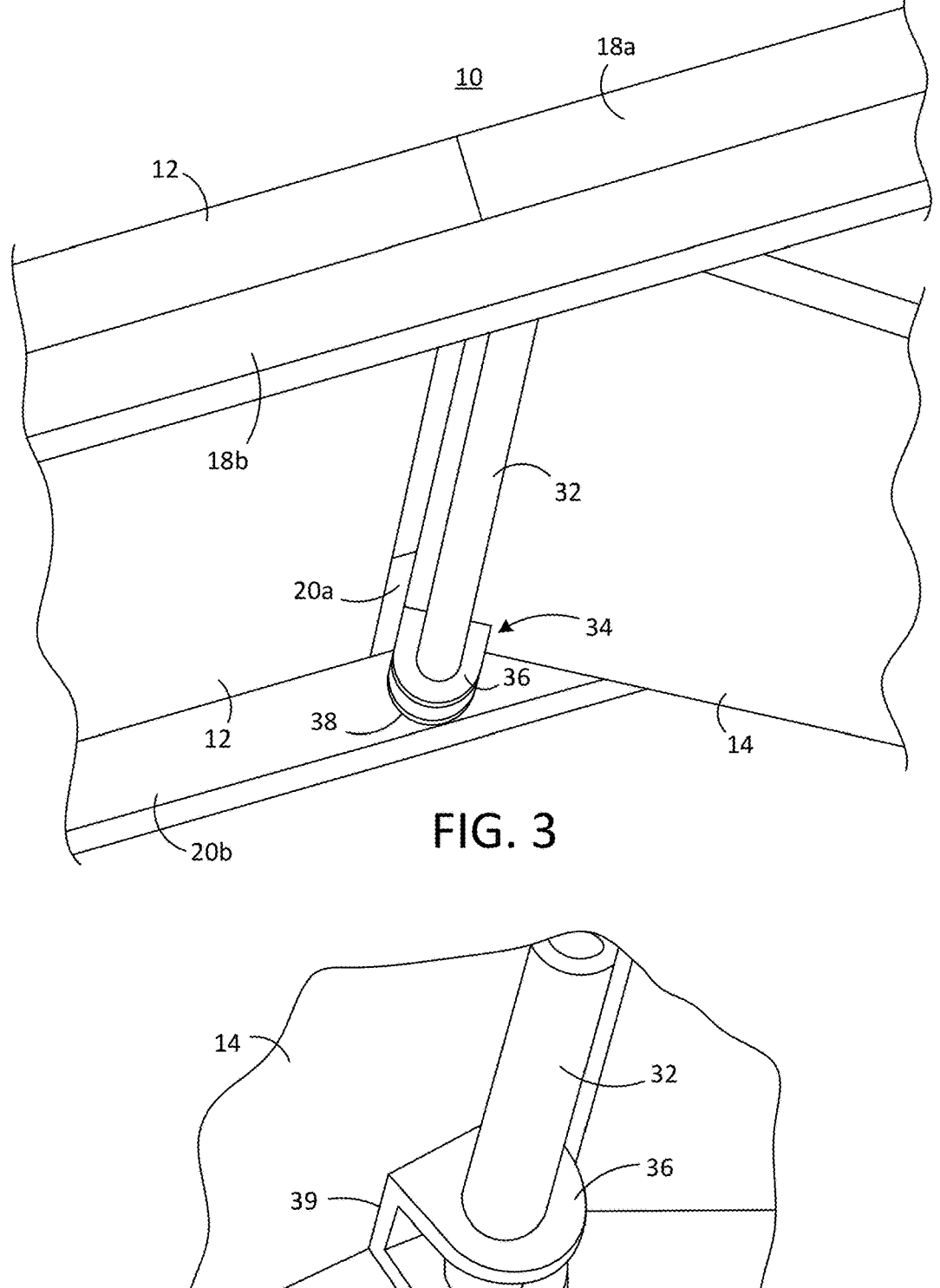
FIG. 3 is a partial isometric bottom view of the furniture bench seat illustrating the hinged connection of the pet ramp.
FIG. 4 is an enlarged view of the hinge apparatus of FIG. 3.

As illustrated in FIG. 3 of the drawings, the pet ramp 14 is pivotally fastened at its rear edge between the lower rail portions 18*b* and 20*b*. Fastened between the lower rails 18*b* and 20*b* is a support rod 32. A bracket 34 includes two spaced-apart apertured flanges 36 and 38. The aperture flanges 36 and 38 are illustrated in more detail in the enlarged drawing of FIG. 4. The flanges 36 and 38 each include a circular hole through which the support rod 32 extends to allow the pet ramp 14 to pivot about the support rod 32. The flanges 36 and 38 are connected together by an interconnecting base member 39. The base member 39 is planer and is fastened to the bottom surface of the pet ramp 14, at the rear portion thereof. The base member 39 can be screwed or otherwise suitably fastened to the pet ramp 14. This arrangement allows the frontal edge of the pet ramp 14 to freely pivot downwardly to the inclined position. In the horizontal position, the back edge of the ramp 14 is slightly spaced from the frontal edge of the platform 12 to generally provide a smooth surface transition. A small gap is necessary between the frontal edge of the platform 12 and the rear edge of the pet ramp 14 so that the pet ramp 14 can be slightly inclined upwardly, as illustrated in FIG. 5.

Figure 5:
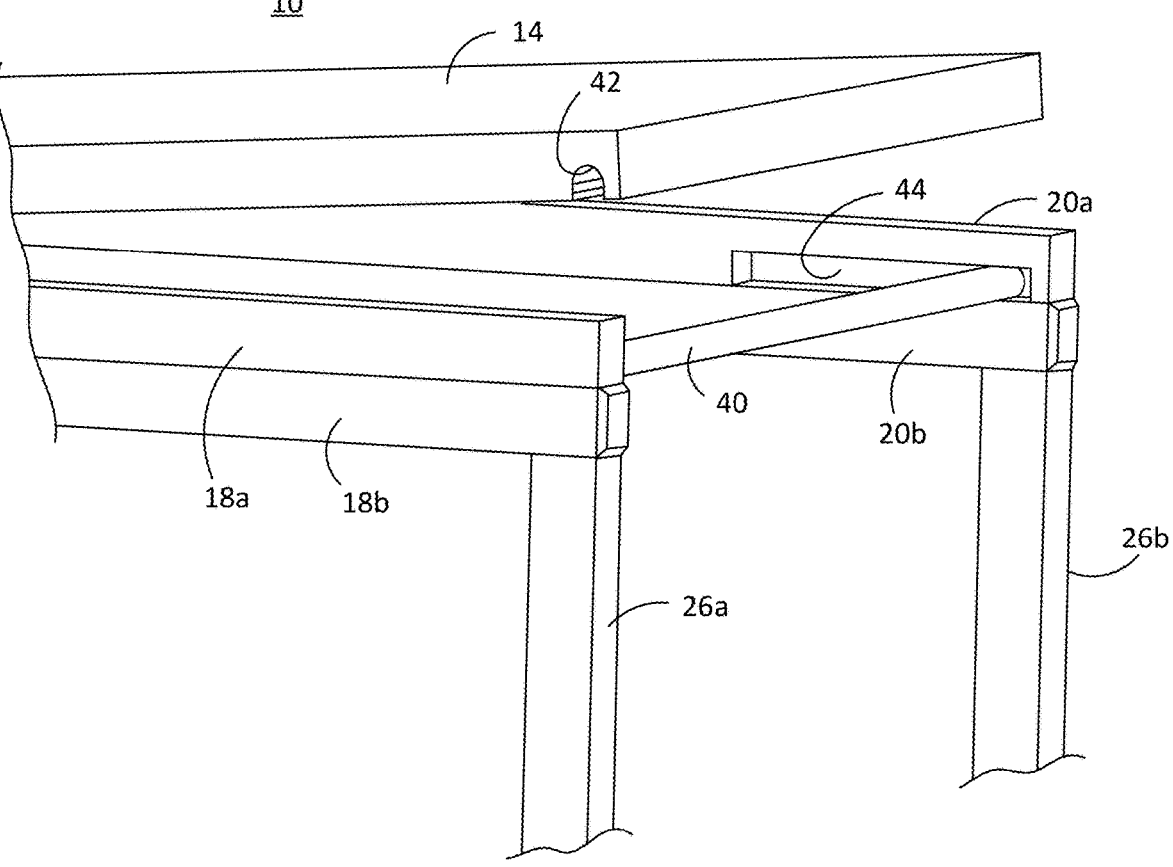
FIG. 5 is a partial isometric end view of the support rod for the end of the pet ramp when hinged to form a part of the furniture bench seat.

FIG. 5 illustrates the pet ramp 14 pivoted upwardly a certain amount, with the frontal edge thereof moved above the upper rails 18*a* and 20*a*. In this position, a rod-like rest 40 can be situated between the frontal ends of the upper rails 18*a* and 20*a* to allow the pet ramp 14 to be lowered to the horizontal rest position. More particularly, the pet ramp 14 includes a semi-circular shaped tunnel 42 on the underside thereof that extends from one side edge to the opposite side edge. The frontal end of the pet ramp 14 can be lowered from that illustrated in FIG. 5 so that the semi-circular tunnel 42 of the pet ramp 14 is engaged on the rod-like support rest 40. With this arrangement, the frontal end of the pet ramp 14 can support heavy loads, such a person sitting thereon. For convenience, the rod-like support rest 40 can be rotatably fastened to the lower rail 18*b* and rotated so that an opposite or free end is engaged within a slot 44 formed in the opposite upper rail 20*a*. Preferably, the anchored end (not shown in FIG. 5) of the rod-like support rest 40 is pivotally mounted to the lower rail 18*b* so that it can be pivoted (counterclockwise to the left in FIG. 5) and hidden within a corresponding slot (not shown) formed in the upper rail 18*a*. This arrangement allows the support rest 40 to be completely removed from the path of the pet ramp 14 when the ramp 14 is pivoted downwardly to the inclined position. With the support rest 40 being supported at both ends as illustrated in FIG. 5, this allows the frontal end of the pet ramp 14 to be fully supported to sustain a substantial weight thereon.

Figures 6, 7:
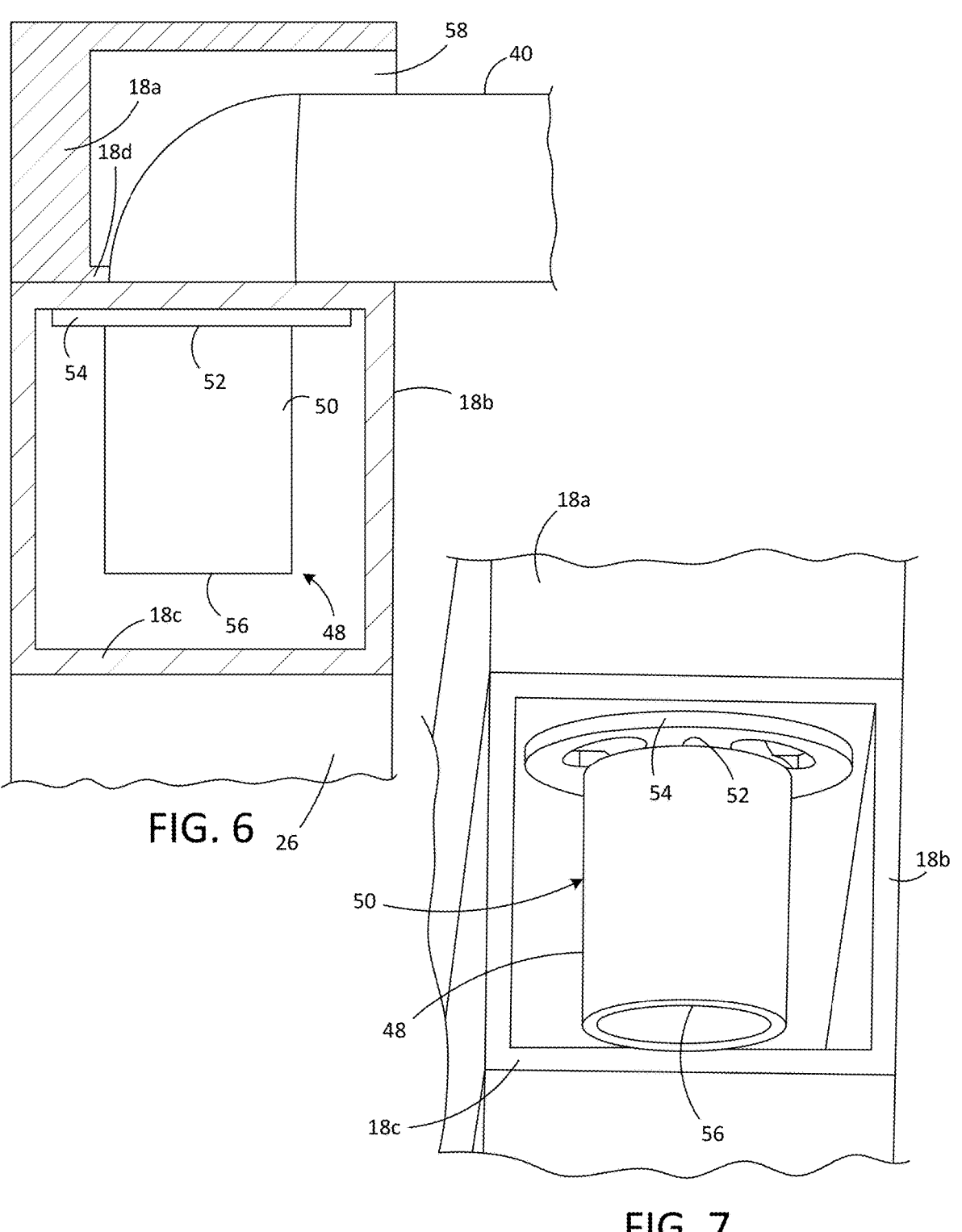
FIG. 6 is an isometric end view of the rotating arrangement for the support rod.
FIG. 7 is an enlarged view of the rotatable support rod of FIG. 6.

FIGS. 6 and 7 illustrate the details of the rotatable end of the support rest 40, which can be constructed with a wood dowel, or more preferably a metal tube or rod. The vertical end portion 48 of the support rest 40 is angled at ninety degrees with respect to the longer horizontal arm, as identified by numeral 40 in FIG. 6. The angled end portion 48 of the support rest 40 extends through a hole (not shown) in the bottom sidewall 18*d* of the upper rail 18*a*. The hole formed in the bottom sidewall 18*d* thereof aligns with the hole in the top sidewall of the lower rail 18*b*. The angled end portion 48 of the support rest 40 protrudes through both aligned holes so that the annular end 56 is spaced from the lower sidewall 18*c*. The angled end portion 48 of the support rod 40 includes an annular slot 52 formed therein for clipping thereto a C-shaped compression clip 54. The clip 54 prevents the support rod end portion 48 from being inadvertently withdrawn from the rails 18*a* and 18*b*. The support rod 40 is able to be rotated to a right angle with respect to the upper rail 18*a* to support the pet ramp 14 thereon via the ramp tunnel 42, and then to a hidden position within a horizontal channel 58 formed within the inside sidewall of the upper rail 18*a*. This allows the support rod 40 to be removed from the path of the pivotal movement of the pet ramp 14.

The furniture bench 10 can be constructed of wood, metal, or other suitable synthetic material. The furniture bench 10 is preferably constructed with a wood material and finished with a surface coating so that it is compatible with standard furniture. As considered herein, if the material from which the furniture bench 10, or other embodiments disclosed, is constructed looks like wood, including, for example, simulated wood, it is considered herein as wood. Moreover, the top surfaces of the furniture bench 10 can be covered with a fabric or other suitable covering that is commensurate with that well known in the furniture industry.

Figure 8:
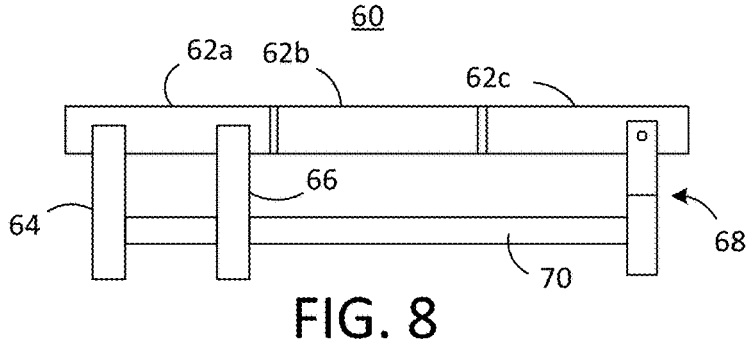
FIG. 8 is a side view of another embodiment of the invention, illustrating a multi-section seat.
Figure 9:
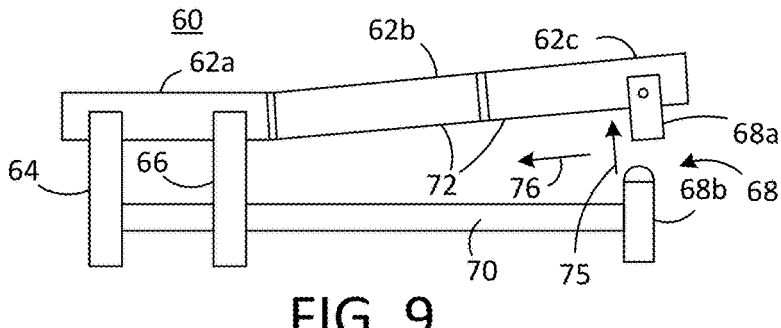
FIG. 9 is a side view of the bench seat of FIG. 8, with one section of the seat hinged upwardly with respect to the two other seat sections to initiate the deployment of the pet ramp.

FIG. 8 illustrates another embodiment of the invention, where a furniture bench 60 is constructed with a multi-seat section 62a-62c that can be converted from a furniture bench to a pet ramp without dismantling any of the bench components. The furniture bench 60 is constructed with a first seat section 62a that is preferably padded with a furniture type upholstered pad 62a. The pad of the seat section 62a is preferably fastened to a hard or rigid base, such as plywood or the like. The seat sections 62b and 62c are similarly constructed, but may be fixed together, even though the seat portion has two pads 62b and 62c. In other words, the seat sections 62b and 62c are not hinged together, but are supported on a common base that is rigid. The three-padded seat sections 62a-62c appear as a single seat. The seat section 62a is, however, hinged to the seat section 62b so that the seat section 62a can be hinged to positions illustrated in FIGS. 9 and 11. The seat sections 62a and 62b can be hinged together at the common edges using a conventional piano hinge, or other suitable hinging apparatus. The hinge can be located so as to connect the rigid bases of the seat section 62a to the rigid base of the seat section 62b. With this hinged arrangement, it is understood that the seat sections 62b and 62c can be easily hinged upwardly together, but will require the edges of seat cushions 62a and 62b to yield so that the seat sections 62b and 62c can be moved, as illustrated in FIG. 9. In other words, the seat cushion edges between the seat sections 62a and 62b will be pushed together to allow the upward pet ramp movement noted in FIG. 9. With this configuration of the furniture bench 60, all of the cushions 62a, 62b and 62c define a seat, while the seat cushions 62b and 62c define the pet ramp 72. Accordingly, at least some of the seat includes the pet ramp 72.

The multi-section seat 62a-62c is supported by six legs, a back set of which is identified as numeral 64, a middle set identified as numeral 66, and a frontal set identified as numeral 68. The rear seat section 62a is supported by the set of legs 64 as well as another set of legs 66. The seat sections 62b and 62c are supported by the frontal set of legs 68, as well as the hinge connection between the seat sections 62a and 62b. As can be appreciated, the multi-section bench seat 62 can support a substantial weight, such as a person sitting thereon.

A rack, such as a magazine or shoe rack 70, extends between the rear set of legs 64, the middle set of legs 66, and the frontal set of legs 68, and is attached thereto in the middle and at the four corners. The shoe rack 70 can be constructed similar to that illustrated in FIGS. 1 and 2. The shoe rack 70 adds rigidity to the furniture bench 60. As will be described below, each of the frontal legs 68 is constructed as a two-part leg structure.

Figure 10:
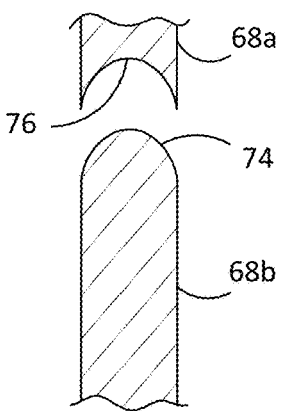
FIG. 10 is an enlarged view of the interconnection arrangement between the top frontal leg part and the bottom frontal leg part.

With reference to FIG. 9, there is illustrated the manner in which the two-section seat 62b and 62c can be moved in order to deploy the pet ramp 72. First, each of the frontal legs 68 is separated vertically into respective leg parts 68a and 68b. This is accomplished by constructing each of the frontal legs 68 in two parts, namely a top part 68a and a bottom part 68b. The interconnection between the top leg part 68a and the bottom leg part 68b is illustrated in more detail in FIG. 10. Here, the top 74 of the bottom leg part 68b is egg-shaped, and the bottom of the top leg part 68a is complementary-shaped 76 to receive the egg-shaped top 74 of the bottom leg part 68b. With this arrangement, when the frontal leg parts 68a and 68b are engaged together, the frontal legs 68 are stable and not prone to become disengaged when a weight is placed on the seat sections 62b and 62c. Other leg interconnection engagement structures can be employed, other than egg-shaped structures. Lastly, the top frontal leg parts 68a are each pivotally mounted to the frontal seat section 62c, such as by a bolt, pin, or the like (not shown). Alternatively, a card table-like pivot and locking arrangement can be employed to allow the top leg part 68a to be pivoted and locked into place.

From the foregoing, the seat sections 62b and 62c can be hinged upwardly as shown by arrow 75, as illustrated in FIG. 9, to disengage the top frontal leg parts 68a from the bottom frontal leg parts 68b. Then, the top frontal leg parts 68a are hinged backwards, as shown by arrow 76. This is illustrated in FIGS. 9 and 11 where the two-section seat 62b and 62c, which defines the pet ramp 72, is lowered into an inclined position to allow a pet to ascend from the floor to furniture that is located adjacent to the furniture bench 60.

Figure 11:
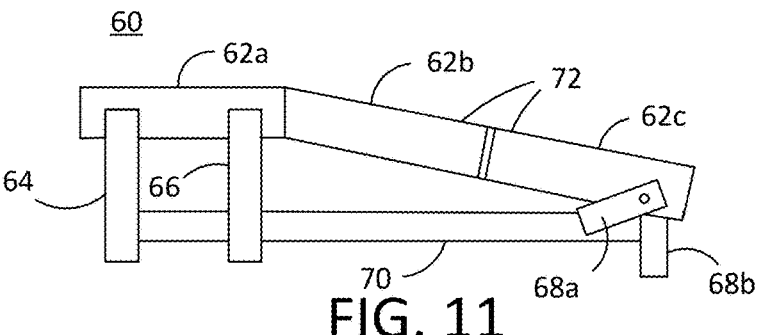
FIG. 11 is a side view of the bench seat of FIG. 8, where the two frontal legs are hinged away so that the two-seat section can be moved to an inclined position for use by pets.

When the pet ramp 72 is fully deployed as illustrated in FIG. 11, the front part of the inclined seat section 62c rests on a cross bar of the shoe rack 70. The seat sections 62b and 62c can thus be converted from a bench seat to an inclined ramp 72. In order to convert the furniture bench 10 from an inclined pet ramp 72 to a horizontal seating arrangement, the foregoing operations can be reversed, namely rotate the pet ramp 72 back to an elevated position shown in FIG. 9, rotate the frontal legs 68a to the vertical positions, engage the same with the bottom parts of the respective frontal legs 68b, thereby converting the bench seat back to that illustrated in FIG. 8. Lastly, the furniture bench 60 can be constructed and finished in a manner to resemble typical household furniture.

Figure 12:
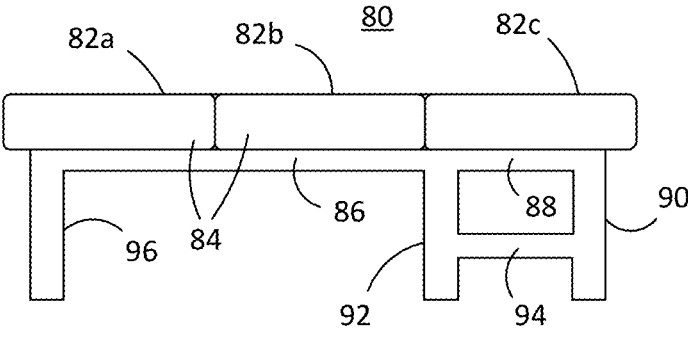
FIG. 12 is a side view of a furniture bench in which the horizontal seat can be converted to a pet ramp.
Figure 13:
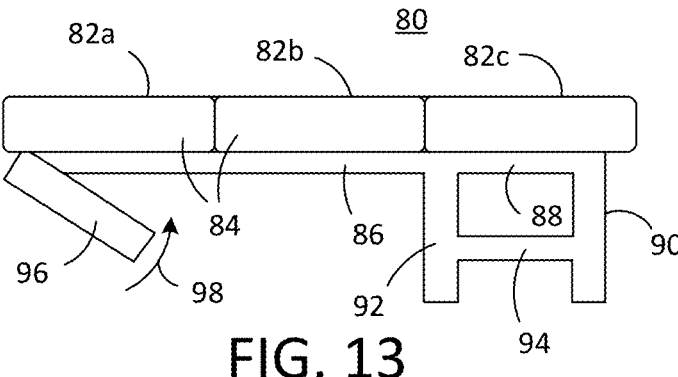
FIG. 13 is a side view of FIG. 12, illustrating how a frontal leg set can be pivoted so that a portion of the seat can be lowered to an inclined position.
Figure 14:
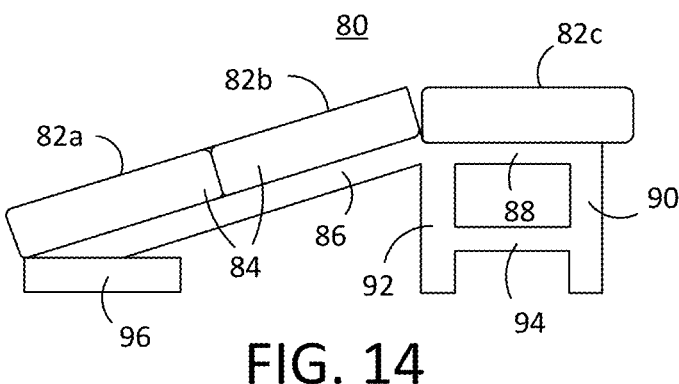
FIG. 14 is a side view of FIG. 13 illustrating the orientation of a portion of the seat to provide a pet ramp.

FIGS. 12-14 illustrate yet another embodiment of the furniture bench 80 of the invention. With this furniture bench 80, the multi-section padded seat section 82a, 82b and 82c convert from a horizontal bench seat to an inclined pet ramp, with seat sections 82a and 82b forming the pet ramp 84. The seat section 82a and 82b have a rigid planar base (not shown) supported by a rigid frame 86 to which the seat sections are fastened. The seat section 82c also has a rigid planar base (not shown) and is also supported by and fixed to a separate rigid frame 88. The rigid planar base of the seat sections 82a and 82b are connected at a rear edge thereof to the rigid planar base of the frontal edge of the seat section 82c. A hinge, such as a piano hinge, can be employed to allow the seat sections 82a and 82b to be hinged with respect to seat section 82c. The seat sections 82a, 82b and 82c define the seat of the furniture bench 80, and the seat cushions 82a and 82b define the pet ramp 84. Accordingly, at least a portion of the seat includes the pet ramp 84.

The frame 88 supporting the seat section 82c is fixed to four legs, a rear set identified as numeral 90 and a frontal set identified as numeral 92. The four legs 90 and 92 are located at the corners of a rectangle. A first cross bar 94 is fixed to a rear leg 90 and a frontal let 92 to provide front to back support. A similar cross bar (not shown) connects a second rear leg (not shown) to a second frontal leg (not shown) to again provide front to back support. A first cross bar (not shown) can be utilized to provide lateral support (sideways) between the back set of legs 90, and a second cross bar (not shown) can be utilized to provide lateral support (sideways) between the front set of legs 92. Alternatively, the supports between the four legs 90 and 92 can be constructed as a small shoe rack, as described above. The furniture bench 80 illustrated in FIG. 12 functions as a padded seat that can be located adjacent to other furniture on which a pet can ascend for sitting thereon. The furniture bench 80 can be constructed and upholstered to provide the appearance of typical household furniture.

FIG. 13 illustrates the furniture bench 80 in an intermediate step in converting the bench 80 to an inclined pet ramp 84, it being understood that the pet ramp 84 comprises the seat sections 82a and 82b. The front-most pair of legs 96 are each pivotally mounted to the frame 86 so that they can pivot in an arc defined by arrow 98. The front-most legs 96 can be pivotally mounted using bolts, pins, or the like. The pair of legs 96 can be connected together using a cross bar (not shown) therebetween so that both front-most legs 96 are pivoted together in unison.

When the front-most legs 96 are pivoted in the arc 98 to a position illustrated in FIG. 14, the ramp 84 is hinged so that the frontal edge of seat section 82a is adjacent the floor. The seat sections 82a and 82b thus provide an inclined ramp 84 to the seat section 82c. A pet can thus ascend from the floor via the inclined ramp 84 to the horizontal seat section 82c and thus to other adjacent furniture. The furniture bench 80 can be converted back to a horizontal bench orientation by reversing the foregoing procedures.

Figure 15:
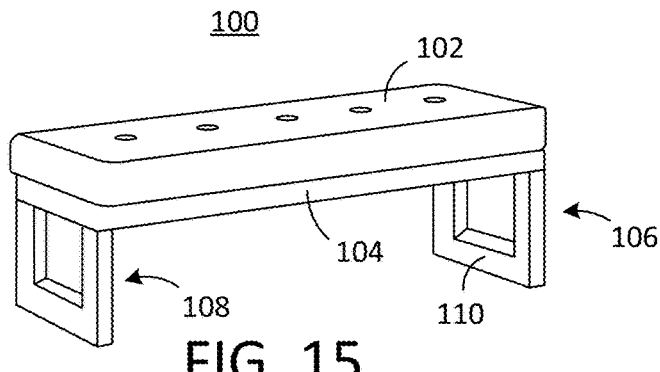
FIGS. 15-18 illustrate another embodiment of the furniture bench of the invention showing the various orientations in which the entire seat of a furniture bench can be converted from a horizontal seat to an inclined pet ramp.

FIGS. 15-18 illustrate yet another embodiment of the invention in which a furniture bench 100 can be converted from a horizontal seat to an inclined pet ramp. FIG. 15 is an isometric view of the furniture bench 100. The furniture bench 100 is constructed to appear like conventional furniture, i.e., including a seat upholstered with a cushion or padding 102. While not shown, the seat cushion 102 is attached to a rigid base. The rigid base of the seat cushion 102 is supported by a rectangular-shaped frame 104 that is constructed to be rigid and sturdy so as to support the weight of one or more persons sitting thereon. The furniture bench 100 of the invention is suitable for use adjacent other furniture on which a pet is allowed.

Figure 16:
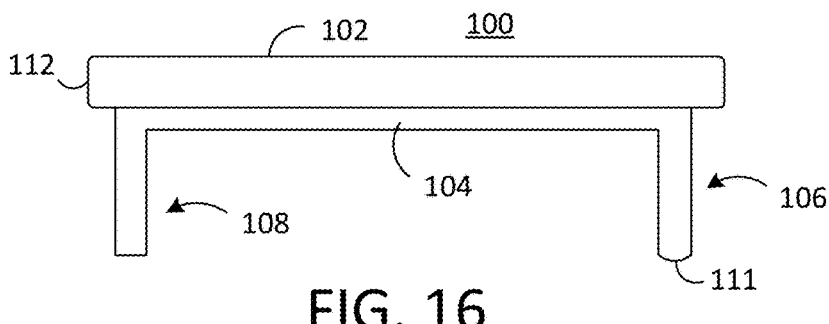

The furniture bench 100 includes a first set of rear legs 106 with a cross bar 110 laterally connecting the bottom ends of the legs 106. The upper ends of the rear legs 106 are suitably fastened in a rigid manner to the frame 104. The bottom ends 111 of the rear legs 106, as well as the frontal bottom edge of the cross bar 110, can be rounded so that when the seat 102 is pivoted to the inclined position, a respective corner of the rear legs 106 and cross bar 110 do not otherwise indent a hardwood floor or other type of floor covering. The rounded bottom end 111 of the rear legs 106 and the cross bar 110 can be accomplished by utilizing a non-slip rubber member, or by milling the legs 106 and the cross bar 110 so as to be rounded. A set of frontal legs 108 are provided that are similar in construction with the back set of legs 106. The upper ends of the frontal legs 108 are fastened to the frame 104 so as to be pivotal. In one configuration, the furniture bench 100 provides a horizontal seat, as illustrated in FIGS. 15 and 16.

Figure 17:
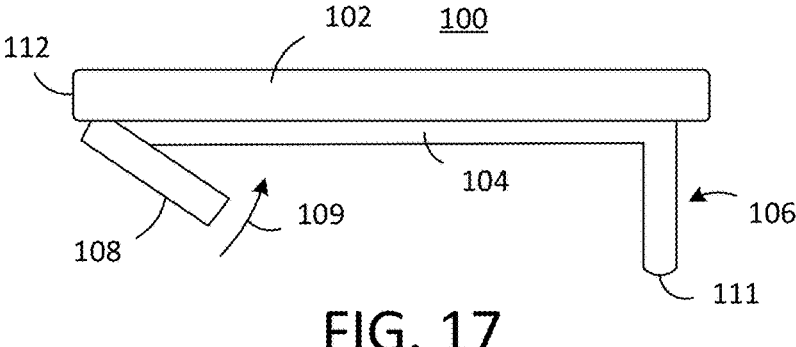
Figure 18:
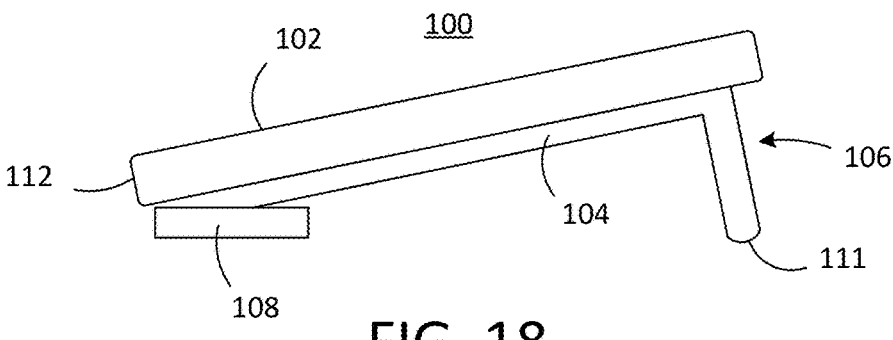

The furniture bench 100 can be converted to a pet ramp, as illustrated in FIGS. 17 and 18. Here, the frontal set of legs 108 are hinged or pivoted in the direction of arrow 109 to that the frontal edge 112 of the cushion 102 is lowered to a position adjacent to the floor. As can be appreciated, the frontal (left in the drawing) end of the furniture bench 100 rests on the frontal folded legs 108 when oriented or configured as a pet ramp. Pets can thus ascend the pet ramp to the top thereof and then onto other furniture adjacent to the furniture bench 100. In this embodiment, the entire pet ramp includes the seat of the furniture bench 100. Again, at least a portion of the seat defines the pet ramp. The pet ramps of the various embodiments need not have a height that is the same as the adjacent furniture.

In all of the embodiments descried above, the pet ramps are all hinged about an axis, and the arc involved is from the full bench seat position to the inclined pet ramp position, and is about 20-30 degrees, and no more than about 45 degrees. The furniture benches of the various embodiments are constructed to appear as common wood furniture, finished to appear as common wood furniture, and upholstered to appear as common wood furniture. Indeed, if the pet ramp is not deployed, the furniture bench looks like common wood furniture benches available on the market, and if deployed, the furniture bench of the invention appears as a common wood furniture bench with a pet ramp attached thereto.

While the preferred and other embodiments of the invention have been disclosed with reference to specific furniture benches, and associated methods of fabrication thereof, it is to be understood that many changes in detail may be made as a matter of engineering or design choices without departing from the spirit and scope of the invention, as defined by the appended claims.

What is claimed is:

1. A furniture bench, comprising:
a two-part seat with a top horizontal surface for sitting on, a first part of said two-part seat being stationary and non-movable with respect to said furniture bench, said first seat part having an edge, and a second seat part of said two-part seat having an edge, the second seat part of said two-part seat comprises a pet ramp, the edges of said first and second seat parts having a hinged connection for allowing said second seat part to rotate about said hinged connection with respect to said first seat part;
said pet ramp is rotatable so that an outer edge thereof moves from a horizontal position and approaches a floor on which said furniture bench rests, and a pet can ascend from the floor and up said pet ramp to said stationary first seat part; and
a plurality of legs for supporting said seat on the floor.

2. The furniture bench of claim 1, wherein said first seat part comprises a stationary platform that does not move from the horizontal position, and said second seat part comprises said pet ramp, and when in horizontal positions, said first seat part and said second seat part have respective top surfaces that are coplanar to each other.

3. The furniture bench of claim 1, wherein said pet ramp moves in an arc less than 45 degrees to approach the floor.

4. The furniture bench of claim 1, further including a rack that is rectangular shaped having four corners, said rack having a structure spanning four sides thereof and constructed to hold household items in a central area thereof, and one leg of said plurality of legs of said furniture bench is located and fixed to a respective corner of said rack.

5. The furniture bench of claim 1, wherein said seat includes a non-movable section, and further including a hinge for connecting an edge of said pet ramp to said non-movable seat section.

6. The furniture bench of claim 4, further including an upper horizontal frame for supporting said seat and said pet ramp when said pet ramp is in a horizontal position, and further including a lower horizontal frame for supporting said rack, and said plurality of legs supporting both said upper horizontal frame and said lower horizontal frame.

7. A furniture bench, comprising:
a seat with a top horizontal surface for sitting on, and at least a portion of said seat comprises a pet ramp;
a plurality of legs for supporting said seat on a floor;
a rack that is rectangular shaped having four corners, said rack suitable for holding household items thereon, and one leg of said plurality of legs of said furniture bench is located and fixed to a respective corner of said rack, an upper horizontal frame for supporting said seat and said pet ramp when said pet ramp is in a horizontal position, and further including a lower horizontal frame for supporting said rack, and said plurality of legs supporting both said upper horizontal frame and said lower horizontal frame; and said pet ramp is rotatable so that an outer edge thereof moves from a horizontal position and approaches the floor on which said furniture bench rests, and a pet can ascend from the floor and up said sitting top surface of said pet ramp.

8. The furniture bench of claim 1, wherein said second seat part of said two-part seat has an end that is rotatable in an arc when said second seat part is hinged about said hinged connection, and further including a support rest for supporting the end of said second seat part when in a horizontal position so that the end of said second seat part allows a person to sit thereon.

9. The furniture bench of 8, wherein said support rest comprises a rod upon which the end of said second seat part rests when in a horizontal position.

10. The furniture bench of claim 8, wherein said support rest is constructed so as to be rotatable at one end thereof and removed from a path of hinged movement of said second seat part when hinged to form a ramp.

11. The furniture bench of claim 1, wherein said hinged connection includes a horizontal rod attached at said horizontal rod ends to a frame of said furniture bench, and said second seat part includes two brackets attached thereto, where said two brackets allow said horizontal rod to rotate therein.

12. The furniture bench of claim 11, wherein said hinged connection is constructed to allow a top surface of said first seat part to be in a horizontal plane that is the same as a horizontal plane of said second seat part.

13. The furniture bench of claim 1, further including a frame for supporting said first seat part and said second seat part, and a support rest on which a pivotal end of said second seat part rests when in a horizontal position, said support rest constructed so that the pivotal end of said second seat part is raised above the horizontal position to disengage said support rest from said second seat part.

14. A furniture bench, comprising:
    said furniture bench constructed with decorative wood to appear as household furniture;
    said furniture bench having a wood frame with a pair of spaced apart upper rails and a pair of spaced apart lower rails;
    a nonmovable seat fastened between said spaced apart upper rails, said seat fastened so as to be laterally nonmovable, and said nonmovable seat having an edge;
    a pivotal seat having an edge, said pivotal seat located adjacent said pair of spaced apart upper rails and said pivotal seat being coplanar with said nonmovable seat when in a horizontal position;
    a hinge connecting the edges of said nonmovable seat and said pivotal seat;
    a leg connecting a respective end of each upper rail to a respective end of each said lower rail, said furniture bench thus having four legs supporting said furniture bench on a floor; and
    said pivotal seat movable in an arc about said hinge to form a ramp allowing a pet to move from the floor to the nonmovabe seat.

15. The furniture bench of claim 14, further including a rack having four corners, each said rack corner fastened to a respective said leg, said rack adapted for holding magazines thereon.

* * * * *